Aug. 14, 1934.  V. FINSTON ET AL  1,970,447
AUTOMATIC RETURN TYPE PLATING MACHINE
Filed Oct. 14, 1932   4 Sheets-Sheet 1
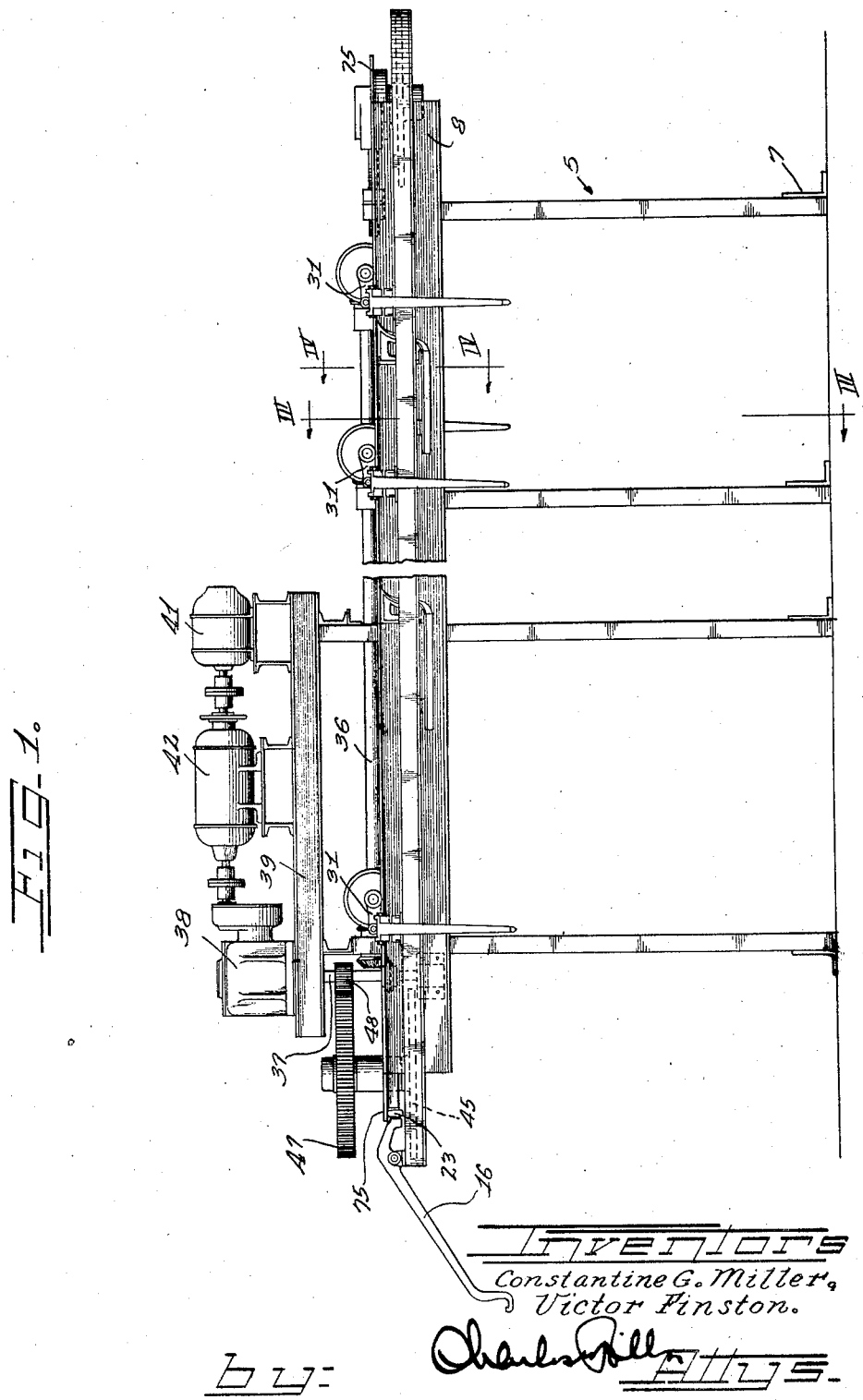

Aug. 14, 1934. V. FINSTON ET AL 1,970,447
AUTOMATIC RETURN TYPE PLATING MACHINE
Filed Oct. 14, 1932 4 Sheets-Sheet 2
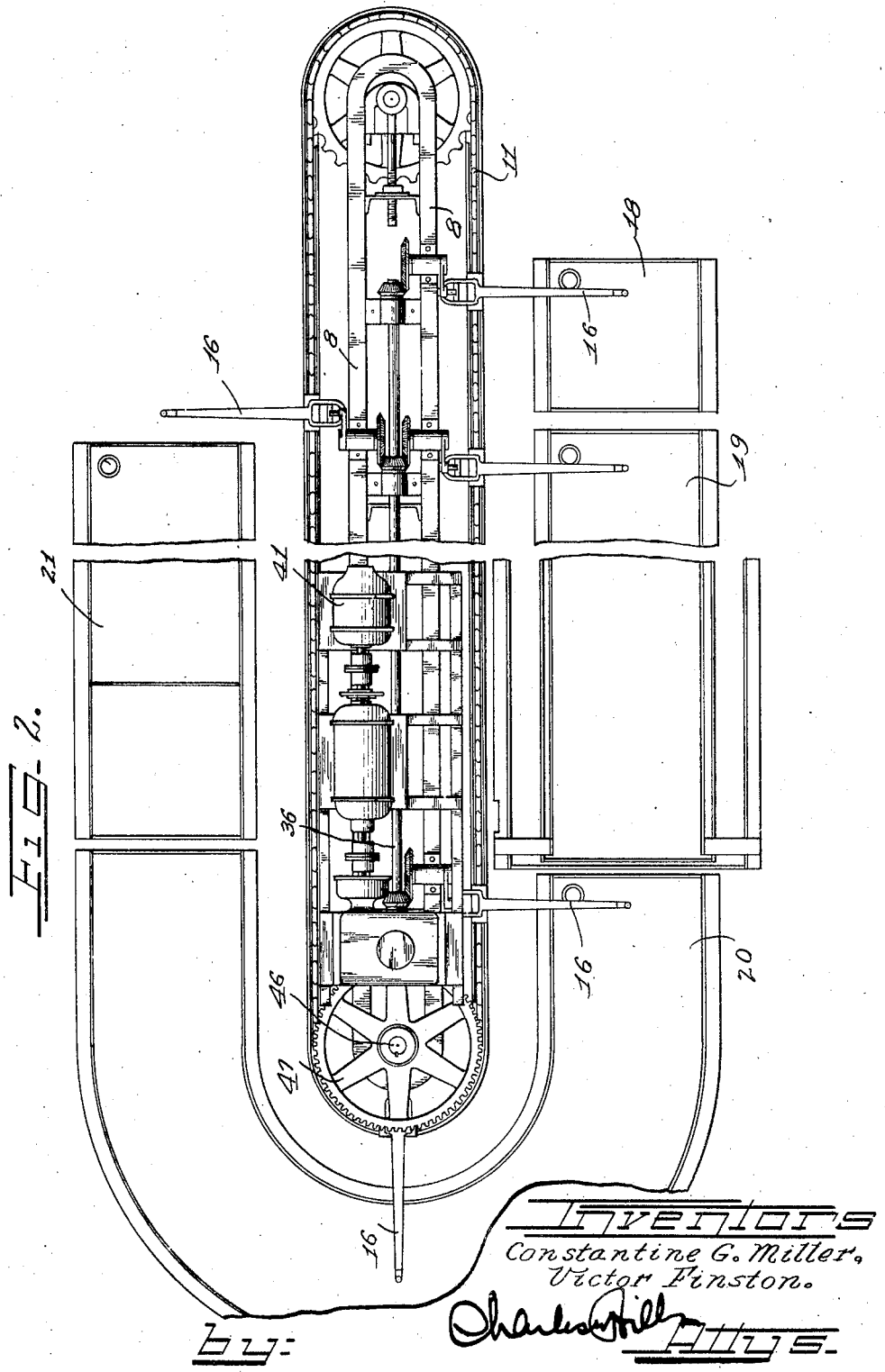

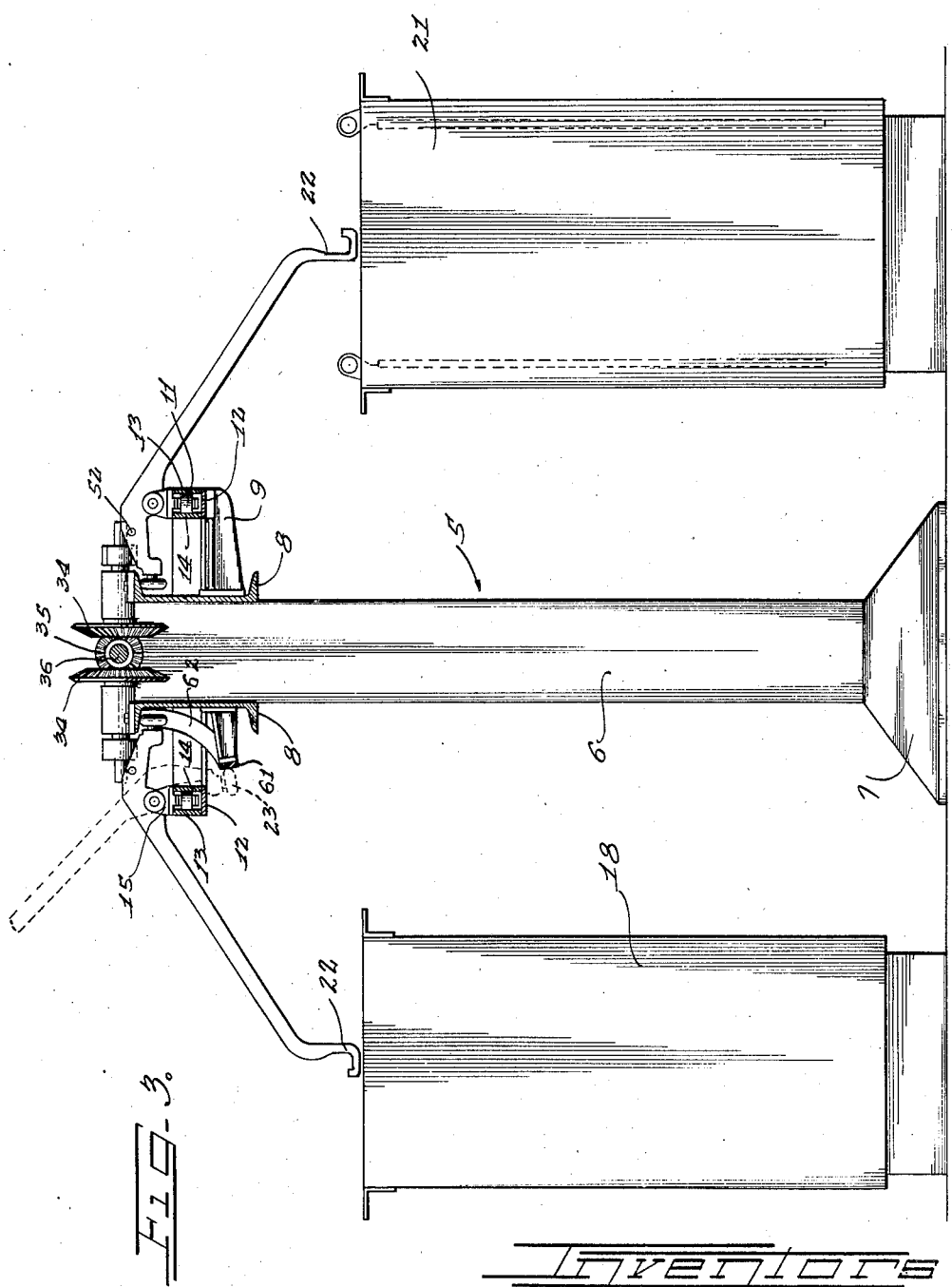

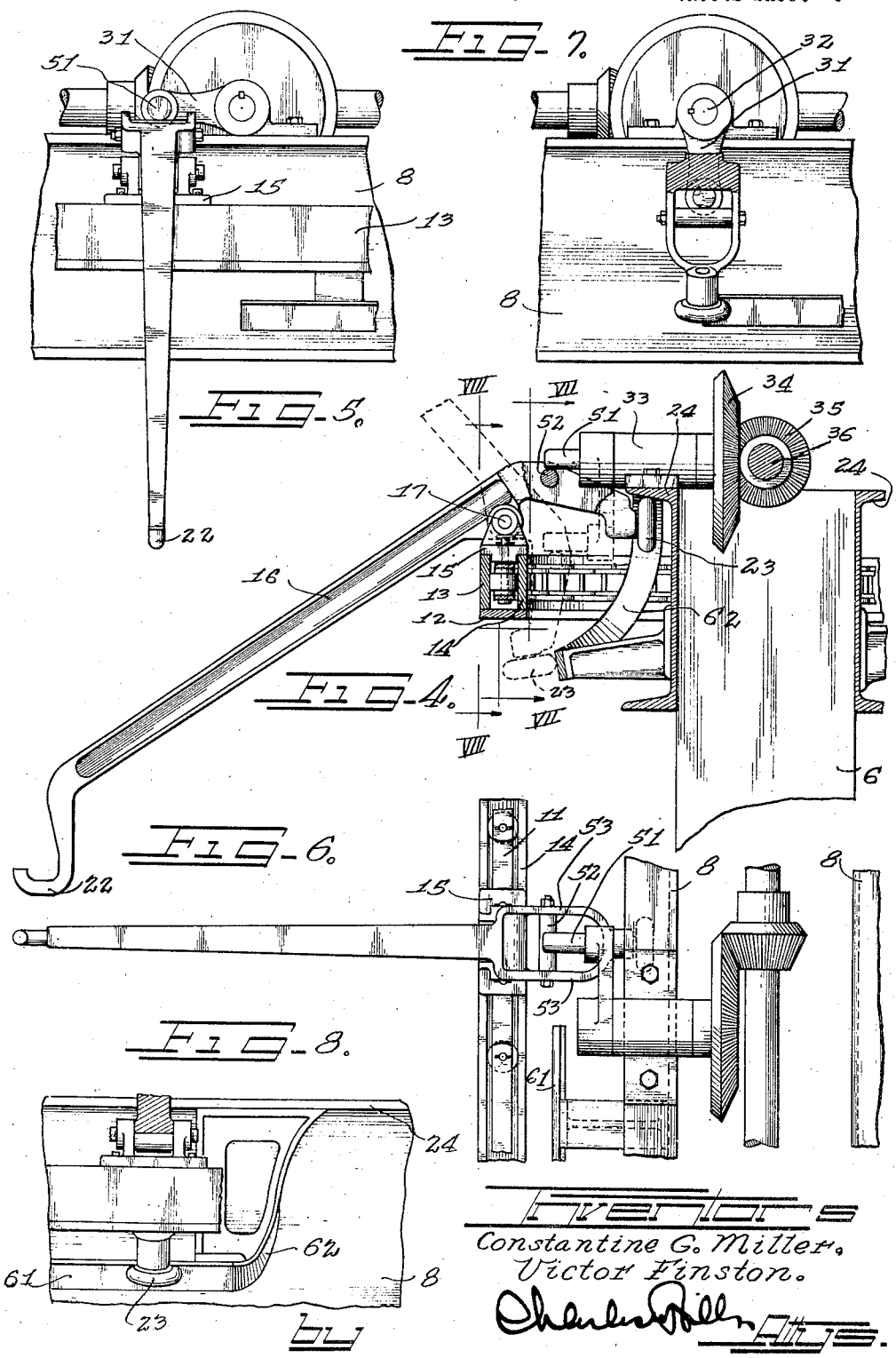

Patented Aug. 14, 1934

1,970,447

UNITED STATES PATENT OFFICE 1,970,447

AUTOMATIC RETURN TYPE PLATING MACHINE

Victor Finston and Constantine G. Miller, Cicero, Ill., assignors to The Meaker Company, Cicero, Ill., a corporation of Illinois Application October 14, 1932, Serial No. 637,738

19 Claims. (Cl. 204—5)

This invention relates to electro-plating machines and will be described as embodied in a machine having mechanism for automatically carrying the work through a series of processing tanks and mechanism for automatically transferring the work from one tank to the next in the series.

An object of this invention is the provision of novel mechanism for quickly lifting the work out of one tank and transferring it to the next without undue exposure to the oxidation effect of the air.

Another object is the provision of lifting mechanism so designed and constructed that frictional resistance to the actuation thereof may be minimized, permitting more efficient and economical operation of the machine, resulting in maximum capacity.

A further object is the provision of improved lifting mechanism adapted to successively cooperate with lifting arms to quickly lift the same when they approach the end of a processing tank to transfer the work from one tank into another with a minimum exposure to the air during the plating process.

In accordance with the general features of this invention, there is provided an electro-plating machine including an endless chain conveyor for conveying the work to be treated through a series of horizontally disposed tanks, the conveyor including arm carriers connected to and moved in a horizontal path by, the endless chain, each of the arm carriers having mounted thereon a work-supporting arm. There is also provided mechanism for raising and lowering the arms at predetermined points in their path of movement whereby the work may be moved successively through the tanks in series, lifted and lowered to be moved over the ends and partitions of the tanks.

Other objects and advantages of this invention will become apparent to those skilled in the art from the following detail description of the accompanying drawings illustrating the same.

On the drawings:

Figure 1 is a side elevation of a machine with parts broken away and incorporating this invention.

Figure 2 is a top plan view of the machine disclosed in Figure 1 and including the series of processing tanks, portions of which are broken away and other parts of the machine being omitted.

Figure 3 is a vertical section taken on the line III—III of Figure 1 and including the processing tanks in elevation.

Figure 4 is a vertical section taken on the line IV—IV of Figure 1.

Figure 5 is a fragmentary side elevation of that shown in Figure 4.

Figure 6 is a fragmentary plan view of that shown in Figure 5.

Figure 7 is a vertical section taken on the line VII—VII of Figure 4, and

Figure 8 is a section taken on the line VIII—VIII of Figure 4.

As shown on the drawings:

The electro-plating machine illustrated in the accompanying drawings comprises a frame designated generally by numeral 5. The frame 5 is constructed of a plurality of longitudinally spaced vertical members 6 having secured thereto adjacent the lower ends angular braces 7 and longitudinally extending channel beams 8 adjacent the top. As illustrated in Figure 3, brackets 9 are secured to the channels 8, upon which is mounted a channel-shaped guideway for an endless chain 11 continuously movable in a horizontal path along the sides and around the ends of the frame. The guideway is constructed of a bottom plate 12 and two spaced vertically and longitudinally extending guide bars 13 and 14 between which the chain is adapted to fit and by which the chain is guided in its path of movement.

An arm carrier 15, best illustrated in Figures 4 and 6, is fixed to the chain for movement therewith. The carrier 15 has a central portion fitting between the guide bars 13 and 14, and marginal portions resting on the upper edges of the guide bars and adapted to slide thereon when moved longitudinally by the chain. A plurality of carriers 15 may be employed in a single machine as illustrated in Figures 1, 2 and 3.

Upon each carrier 15 is mounted a work-carrying arm 16 which is pivoted at 17 to the carrier intermediate the length of the arm and disposed at substantially right angles to the longitudinal axis of the chain for extending over processing tanks 18, 19, 20 and 21 illustrated in Figure 2. On the outer ends of the arms 16 are formed work-supporting hooks 22, and on the inner ends of the arms 16 are journalled rollers 23 which are engageable with the outwardly extending flanges 24 on the upper edges of the channel members 8. When the rollers 23 are in such a position, the outer ends of the arms 16 are in their lowermost position for supporting work to be processed in the tanks. In order that the hooks 22 on the arms 16 may be rapidly lifted and subsequently rapidly lowered for transferring work from one processing tank to the next in the series, there is provided a crank 31 mounted on a shaft 32 which is journalled at 33 on the frame. On the inner end of the shaft 32 is fixed a bevel gear 34 having driving engagement with a smaller bevel gear 35 fixed to a line shaft 36 also mounted on the frame. The line shaft 36 is driven through bevel gears from the vertical shaft 37 extending downwardly from the gear reduction mechanism 38 fixed to an auxiliary frame 39 above the main frame. The gear reduction 38 is driven by a suitable prime mover 41 through another gear reduction mechanism 42 in any desirable manner.

For the purpose of moving the chain longitudinally, there is provided a driving sprocket 45 which is driven through a shaft 46 on which is mounted a driven gear 47 which is in turn driven by a pinion 48 on the shaft 37 and thus by the prime mover 41.

On the outer end of each crank 31 is secured a crank pin 51, which is engageable with a transverse pin 52 best shown in Figure 6. The pin 52 is disposed between the spaced portion 53 of the inner portion of the arm, the cranks 31 normally rotating in a counter clockwise direction as viewed in Figure 1 and serve to depress the pins 52 and the inner portions of the arms 16 to raise the outer ends of the arms 16 and lift the work from the tank. For the purpose of temporarily holding the outer ends of the arms in elevated position, there is provided adjacent each crank 31, a track for the rollers 23, which track includes a longitudinally extending portion 61 spaced from the frame and extending parallel therewith, and a second portion 62 having a cam-like formation extending from one end of the track portion 61, to the flange 24 on which the roller 23 normally rides and for the purpose of rapidly transferring the roller from the position shown in Figure 8 to the position shown in Figure 4 and at the same time permitting the work on the arm 16 to be lowered into a succeeding tank in the series.

As shown in Figure 1, curved track members are provided at the ends of the channels 8 for connecting one flange 24 on the upper edge of one channel with the flange 24 on the upper edge of the other channel in order that a continuous guide may be formed for the roller 23 on the arm 16. The operation of the machine, it is believed, will be clearly understood from the above description. It may be added that the prime mover 41 causes the chain 11 to continuously move in the direction indicated by the arrow in Figure 2. The prime mover 41 also causes rotation of the crank 31 in synchronism with the movement of the chain such that the crank ends 51 will engage each pin 52 on the arms 16 as they pass along, causing the rollers 23 to be placed upon the tracks 61 for holding the outer ends of the arms in raised position. Consequently the rollers 23 ride over the track portions 62 and return to the flanges 24 on the channels 8 and thereby cause the work on the arms 16 to be lowered into succeeding tanks along the series without undue exposure of the work to the oxidation of the air. This is because of the relatively rapid movement of the arms 16 upwardly and downwardly at the ends of the tanks made possible by this invention.

The anode connection of the electric circuit is made to the anode members in the solution tanks. The cathode connection is made to the guide bars 13 and 14, which thus also serve as cathode bus bars as well as for guide bars and supports for the arm carriers. The electric circuit is completed by the contact of the arm carrier 15 as it slides along on the guide bars 13 and 14.

It will be understood by those skilled in the art that the machine herein illustrated and described is susceptible of various forms and modifications without departing from the principle of the invention and we accordingly desire that the patent to be granted hereon shall not be restricted in any manner except as necessitated by the prior art.

We claim as our invention:

1. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, and power actuated rotary eccentric means engaging said arms to oscillate the same at predetermined points in their path of movement.

2. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, a power actuated crank on said frame engageable with each arm to oscillate the same as each arm successively passes a predetermined point in its path of movement.

3. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, a power actuated crank on said frame, a crank pin adjacent the free end of said crank, means on each arm engageable successively by said crank pin whereby oscillatory movement is imparted to each arm as each passes a predetermined point in its path of movement.

4. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, a power actuated crank on said frame, a contact member on each arm engageable by said crank to be actuated thereby and cause oscillation of each arm successively.

5. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, a power actuated crank on said frame engageable with each arm to oscillate the same as each arm successively passes a predetermined point in its path of movement, a prime mover on said frame operably connected to said conveyor for driving the same and means operably connecting said prime mover to said power-actuated crank.

6. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriage and extending over said tanks, a power actuated crank on said frame, a crank pin adjacent the free end of said crank, means on each arm engageable successively by said crank pin whereby oscillatory movement is imparted to each arm as each passes a predetermined point in its path of movement, a prime mover on said frame operably connected to said conveyor for driving the same and means operably connecting said prime mover to said power-actuated crank.

7. In an electro-plating machine, a frame, processing tanks disposed in series along the sides of the frame, an endless conveyor for moving work through the processing tanks, said conveyor comprising a horizontally disposed endless chain moving along the sides and around the ends of said frame, carriers fixed on and movable with said chain, work support arms pivotally mounted on said carriers and extending over said tanks, a power actuated crank on said frame, a contact member on each arm engageable by said crank to be actuated thereby and cause oscillation of each arm successively, a prime mover on said frame operably connected to said conveyor for driving the same and means operably connecting said prime mover to said power-actuated crank.

8. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, and power actuated rotary eccentric means engaging said arms to oscillate the same at predetermined points in their path of movement to lift work from one tank and place it in another tank in the series.

9. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame engageable with each arm to oscillate the same as each arm successively passes a predetermined point in its path of movement.

10. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame, a crank pin adjacent the free end of said crank, means on each arm engageable successively by said crank pin whereby oscillatory movement is imparted to each arm as each passes a predetermined point in its path of movement.

11. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame, a contact member on each arm engageable by said crank to be actuated thereby and cause oscillation of each arm successively.

12. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame engageable with each arm to oscillate the same as each arm successively passes a predetermined point in its path of movement, a prime mover on said frame operably connected to said conveyor for driving the same and means operably connecting said prime mover to said power-actuated crank.

13. In an electro-plating machine, a frame, processing tanks disposed in series along the sides of the frame, work-supporting arms extending over said tanks for moving work through solutions in the tanks, and endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame, a crank pin adjacent the free end of said crank, means on each arm engageable successively by said crank pin whereby oscillatory movement is imparted to each arm as each passes a predetermined point in its path of movement, a prime mover on said frame operably connected to said conveyor for driving the same and means operably connecting said prime mover to said power-actuated crank.

14. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, a power-actuated crank on said frame, a contact member on each arm engageable by said crank to be actuated thereby and cause oscillation of each arm successively, a prime mover on said frame operably connected to said conveyor for driving the same and means operably connecting said prime mover to said power-actuated crank.

15. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, said frame including an outwardly and longitudinally extending flange, a track on said frame comprising a portion spaced laterally from said frame and a second portion having a cam surface extending from the spaced portion to the under surface of said flange, a roller on the inner end of each arm engageable with said flange while being moved by said chain, and a power-actuated crank on said frame engageable with said arms successively as they pass a predetermined point in their path of movement, and adapted to oscillate each arm successively and place said rollers successively on the portion of said track spaced from said frame to hold the outer ends of the arms in raised position.

16. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, said frame including an outwardly and longitudinally extending flange, a track on said frame comprising a portion spaced laterally from said frame and a second portion having a cam surface extending from the spaced portion to the under surface of said flange, a roller on the inner end of each arm engageable with said flange while being moved by said chain, means for moving each roller successively from said flange to the spaced portion of said track to raise the outer end of the corresponding arm and power means for moving said chain to automatically move the roller over the portion of said track extending to said flange to return the arm to its lowered position.

17. In an electro-plating machine, a frame, processing tanks disposed in series along the sides of the frame, work-supporting arms extending over said tanks for moving work through solutions in the tanks, an endless conveyor chain mounted on said frame for movement in a horizontal plane along the sides of said frame, guide bars disposed along opposite sides of said chain for guiding said chain, carriers fixed on said chain, said carriers adapted to rest on and slidably engage said guide bars, said arms being pivotally secured to said carriers intermediate the length of the arms, said frame including an outwardly and longitudinally extending flange, a track on said frame comprising a portion spaced laterally from said frame and a second portion having a cam surface extending from the spaced portion to the under surface of said flange, a roller on the inner end of each arm engageable with said flange while being moved by said chain, a power-operated crank on said frame, means on said crank operably engageable with the inner portion of each arm successively to depress the same for lifting the outer end of the arm and place the roller on the track spaced from the frame to hold the arm in raised position, and power means for moving said chain to automatically move the roller over the portion of said track extending to said flange to return the arm to its lowered position.

18. A conveying device for conveying work between a series of operation stations separated by barriers comprising a work carrier, a work support arm pivotally mounted on said carrier, and power-actuated rotary eccentric means engaging said arm to oscillate the same at predetermined points in its path of movement.

19. A conveying device for conveying work between a series of operation stations separated by barriers comprising a work carrier, a work support arm pivotally mounted on said carrier, and power-actuated rotary eccentric means engaging said arm to oscillate the same at predetermined points in its path of movement, said eccentric means comprising a crank engageable with said arm at said predetermined points.

VICTOR FINSTON.
CONSTANTINE G. MILLER.